United States Patent
Kawase

(10) Patent No.: US 8,432,168 B2
(45) Date of Patent: Apr. 30, 2013

(54) FUEL CELL SYSTEM

(75) Inventor: Ayako Kawase, Gamou-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 406 days.

(21) Appl. No.: 12/741,794

(22) PCT Filed: Oct. 23, 2008

(86) PCT No.: PCT/JP2008/069252
§ 371 (c)(1),
(2), (4) Date: May 6, 2010

(87) PCT Pub. No.: WO2009/060728
PCT Pub. Date: May 14, 2009

(65) Prior Publication Data
US 2010/0264930 A1    Oct. 21, 2010

(30) Foreign Application Priority Data
Nov. 8, 2007  (JP) ................. 2007-290541

(51) Int. Cl.
*G01R 31/36* (2006.01)
*H02J 7/00* (2006.01)
(52) U.S. Cl.
USPC ............ 324/430; 320/101; 320/138; 320/139
(58) Field of Classification Search ............... 324/430
See application file for complete search history.

(56) References Cited

U.S. PATENT DOCUMENTS

| | | | |
|---|---|---|---|
| 5,937,829 A * | 8/1999 | Endou | 123/497 |
| 6,519,539 B1 * | 2/2003 | Freeman et al. | 702/65 |
| 6,762,587 B1 * | 7/2004 | Barbetta | 320/116 |
| 7,099,787 B2 * | 8/2006 | Gasda et al. | 702/63 |
| 8,129,998 B2 * | 3/2012 | Watanabe et al. | 324/430 |
| 2003/0113594 A1 * | 6/2003 | Pearson | 429/9 |

FOREIGN PATENT DOCUMENTS

| | | |
|---|---|---|
| JP | 2002-367650 A | 12/2002 |
| JP | 2003-014796 A | 1/2003 |
| JP | 2003-086220 A | 3/2003 |
| JP | 2005-285614 A | 10/2005 |
| JP | 2005-332702 A | 12/2005 |
| JP | 2006-220629 A | 8/2006 |
| JP | 2006-266960 A | 10/2006 |
| JP | 2007-012413 A | 1/2007 |
| JP | 2007-018741 A | 1/2007 |
| JP | 2007-048559 A | 2/2007 |
| JP | 2007-048628 A | 2/2007 |
| JP | 2007-250365 A | 9/2007 |
| JP | 2008-098134 A | 4/2008 |
| WO | 2007/004732 A1 | 1/2007 |

* cited by examiner

*Primary Examiner* — Yalkew Fantu
(74) *Attorney, Agent, or Firm* — Kenyon & Kenyon LLP

(57) ABSTRACT

There is provided an impedance measuring system which can accurately measure the impedance of a fuel cell. A motor rotation number detection unit successively detects the rotation number of a motor controlled by an inverter and outputs the detection result to a superposition signal generation unit. The superposition signal generation unit sets the frequency of an impedance measuring signal to a non-resonant frequency so that the control signal of the motor will not resonate with the impedance measuring signal. Thus, by setting the frequency of the impedance measuring signal to the non-resonant frequency, the resonance with the motor is suppressed, which can improve impedance measurement accuracy.

4 Claims, 7 Drawing Sheets

FIG. 8

| OUTPUT POWER | FREQUENCY OF IMPEDANCE MEASURING SIGNAL |
|---|---|
| $P_1 \sim P_2$ | $f_{st1}$ |
| $P_2 \sim P_3$ | $f_{st2}$ |
| $P_3 \sim P_4$ | $f_{st3}$ |
| ⋮ | ⋮ |

| OUTPUT VOLTAGE | FREQUENCY OF IMPEDANCE MEASURING SIGNAL |
|---|---|
| $V_1 \sim V_2$ | $f_{ss1}$ |
| $V_2 \sim V_3$ | $f_{ss2}$ |
| ⋮ | ⋮ |

MP2

FUEL CELL SYSTEM

This is a 371 national phase application of PCT/JP2008/069252 filed 23 Oct. 2008, which claims priority to Japanese Patent Application No. 2007-290541 filed 8 Nov. 2007, the contents of which are incorporated herein by reference.

TECHNICAL FIELD

The present invention relates to an impedance measuring system which measures the impedance of a fuel cell.

BACKGROUND ART

In a fuel cell system, a fuel cell of a solid polymer type is mounted in which a solid polymer membrane having a proton conductivity is applied to an electrolyte layer. As a method for detecting an abnormality generated in such a fuel cell, a method is known in which the impedance of the fuel cell when applying an alternate current having a specific frequency (hereinafter referred to as the impedance having the specific frequency) is measured to detect the abnormality based on the measurement result (e.g., see Patent Document 1).

Patent Document 1: Japanese Patent Application Laid-Open No. 2002-367650

DISCLOSURE OF THE INVENTION

Problem to be Solved by the Invention

However, even when any abnormality is not generated in a fuel cell, the value of the impedance of the fuel cell changes in accordance with the operation state of the fuel cell. Therefore, there has been a problem that when the impedance having a specific frequency is only measured as described above, it cannot correctly be judged whether or not a certain abnormality is generated in the fuel cell or whether or not the operation state of the fuel cell only changes.

Moreover, the value of the impedance of the fuel cell is utilized in a case where the current/voltage characteristics (IV characteristics) of the fuel cell are estimated, but there has been a problem that when the value of the impedance is not correct, the IV characteristics cannot accurately be estimated.

The present invention has been developed in view of the above-mentioned situation, and an object thereof is to provide an impedance measuring system capable of accurately measuring the impedance of a fuel cell.

Means for Solving the Problem

To solve the above-mentioned problem, an impedance measuring system according to the present invention is an impedance measuring system which measures the impedance of a fuel cell, characterized by including: an electronic device connected to the fuel cell and controlled by a frequency; detection means for detecting the frequency of a control signal to control the electronic device; decision means for determining the measurement frequency of the impedance based on the detected frequency; and measurement means for measuring the impedance at the determined measurement frequency.

According to such a constitution, the frequency of the control signal of the electronic device controlled by the frequency is detected, and the measurement frequency of the impedance is determined based on the detected frequency. Therefore, the measurement frequency of the impedance can be determined so that the frequency does not resonate with the control signal of the electronic device, whereby the impedance of the fuel cell can accurately be measured.

Here, in the above-mentioned constitution, the electronic device is preferably a motor connected to the fuel cell, and the decision means determines, as the measurement frequency of the impedance, a frequency which does not resonate with the detected frequency.

Moreover, another impedance measuring system according to the present invention is an impedance measuring system which measures the impedance of a fuel cell, characterized by including detection means for detecting the operation state of the fuel cell; decision means for determining the measurement frequency of the impedance based on the detected operation state; and measurement means for measuring the impedance at the determined measurement frequency.

Here, in the above constitution, the detection means preferably detects the output power of the fuel cell, and the decision means determines the measurement frequency of the impedance based on the detected output power of the fuel cell.

Moreover, in the above constitution, the detection means preferably detects the output voltage of the fuel cell, and the decision means determines the measurement frequency of the impedance based on the detected output voltage of the fuel cell.

Effect of the Invention

As described above, according to the present invention, the impedance of a fuel cell can accurately be measured.

BEST MODE FOR CARRYING OUT THE INVENTION

Hereinafter, an embodiment according to the present invention will be described with reference to the drawings.

A. First Embodiment

A-1. Entire Constitution

FIG. 1 shows a schematic constitution of a vehicle in which a fuel cell system 100 according to a first embodiment is mounted. It is to be noted that in the following description, a fuel cell hybrid vehicle (FCHV) is assumed as one example of the vehicle, but the present invention is applicable even to an electric car or a hybrid car. Moreover, the present invention is applicable to not only the vehicle but also various mobile bodies (e.g., a ship, an airplane, a robot, etc.), a stational power source and a portable fuel cell system.

A fuel cell 40 is means for generating a power from a supplied reactant gas (a fuel gas and an oxidizing gas), and various types of fuel cells such as a solid polymer type, a phosphoric acid type and a molten carbonate type may be utilized. The fuel cell 40 has a stack structure in which a plurality of unitary cells including an MEA and the like are stacked in series. The output voltage (hereinafter referred to as the FC voltage) and the output current (hereinafter referred to as the FC current) at the actual operation point of this fuel cell 40 are detected by a voltage sensor 141 and a current sensor 142, respectively. A fuel gas such as a hydrogen gas is supplied from a fuel gas supply source 10 to a fuel pole (an anode) of the fuel cell 40, whereas an oxidizing gas such as air is supplied from an oxidizing gas supply source 70 to an oxygen pole (a cathode).

The fuel gas supply source 10 is constituted of, for example, a hydrogen tank, various valves and the like, and a valve open degree, an ON/OFF time and the like are regulated to control the amount of the fuel gas to be supplied to the fuel cell 40.

The oxidizing gas supply source 70 is constituted of, for example, an air compressor, a motor for driving the air compressor, an inverter and the like, and the rotation number of the motor or the like is regulated to regulate the amount of the oxidizing gas to be supplied to the fuel cell 40.

A battery 60 is a chargeable/dischargeable secondary cell, and is, for example, a nickel hydrogen battery or the like. Needless to say, instead of the battery 60, a chargeable/dischargeable accumulator (e.g., a capacitor) other than the secondary cell may be provided.

This battery 60 and the fuel cell 40 are connected in parallel with an inverter 110 for a traction motor, and a DC/DC converter 130 is provided between the battery 60 and the inverter 110.

The inverter 110 is, for example, a PWM inverter of a pulse width modulation system, and converts a direct-current power output from the fuel cell 40 or battery 60 into a three-phase alternate-current power in accordance with a control command given from a control device 80 to supply the power to a traction motor (hereinafter referred to simply as the motor) 115. The motor 115 is a motor for driving wheels 116L, 116R, and the rotation number of such a motor is controlled by the inverter 110.

The DC/DC converter 130 is a full bridge converter constituted of, for example, four power transistors and a drive circuit for exclusive use (not shown). The DC/DC converter 130 has a function of raising or lowering a DC voltage input from the battery 60 to output the voltage to a fuel cell 40 side and a function of raising or lowering a DC voltage input from the fuel cell 40 or the like to output the voltage to a battery 60 side. Moreover, the functions of the DC/DC converter 130 realize the charge/discharge of the battery 60.

Auxiliary devices 120 such as vehicle auxiliary devices and FC auxiliary devices are interposed between the battery 60 and the DC/DC converter 130. The battery 60 is a power source for these auxiliary devices 120. It is to be noted that the vehicle auxiliary devices are various power devices (a lighting device, an air conditioning device, a hydraulic pump, etc.) used during the operation of the vehicle or the like, and the FC auxiliary devices are various power devices (a pump for supplying the fuel gas or the oxidizing gas, etc.) used for the operation of the fuel cell 40.

The control device 80 is constituted of a CPU, an ROM, an RAM and the like, and centrally controls system parts based on sensor signals input from the voltage sensor 141 for detecting the FC voltage, the current sensor 142 for detecting the FC current, a temperature sensor 50 for detecting the temperature of the fuel cell 40, an SOC sensor for detecting the state of the charge of the battery 60, an acceleration pedal sensor for detecting the open degree of an acceleration pedal and the like. Moreover, the control device 80 measures the impedance of the fuel cell 40 by use of the sensor signals as follows.

A-2. Description of Impedance Measurement

FIG. 2 is a diagram showing an equivalent circuit of the fuel cell 40.

R1, R2 in the equivalent circuit are direct-current resistance components (the resistance of an electrolyte membrane, etc.) of the fuel cell 40, and C1 is a capacity component of the fuel cell 40.

FIG. 3 plots (Cole-Cole plot), on a complex plane, the impedance of the fuel cell 40 in a case where impedance measuring signals of high to low frequencies are applied to the equivalent circuit of FIG. 2. Here, when voltage lowering by a direct-current resistance in IV characteristics is obtained, the measured real part of the impedance is a direct-current resistance estimated value Re, and this direct-current resistance estimated value R2 is multiplied by the FC current detected by a current sensor 150. In consequence, the voltage lowering by the direct-current resistance is obtained, but to accurately obtain the voltage lowering by the direct-current resistance, the impedance needs to be accurately measured.

The present inventor measured the impedance on various conditions, recognized an abnormality in an impedance measured value on specific conditions, and hence investigated a cause for this abnormality. As a result, it has been clarified that the cause is the resonance of the control signal of the motor 115 with the impedance measuring signal.

FIGS. 4 and 5 are explanatory views of a relation between the frequency of the impedance measuring signal and an alternate-current impedance. The ordinate of FIG. 4 indicates the frequency of the impedance measuring signal, the ordinate of FIG. 5 indicates the alternate-current impedance, and the abscissas of FIGS. 4 and 5 indicate time, respectively. Moreover, f0 shown in FIG. 4 is the frequency (hereinafter referred to as the resonance frequency) of the impedance measuring signal which resonates with the control signal of the motor 115, and f1 is the frequency (hereinafter referred to as the non-resonant frequency) of the impedance measuring signal which does not resonate with the control signal of the motor 115.

As shown in FIG. 4, when the frequency of the impedance measuring signal is set to the resonance frequency f0 (Hz), the alternate-current impedance causes hunching. However, it has been confirmed that when the frequency of the impedance measuring signal is changed from the resonance frequency f0 (Hz) to the non-resonant frequency f1 (Hz), the hunching of the alternate-current impedance is eliminated, and the impedance becomes substantially constant.

Based on the above results, in the present embodiment, the rotation number (in other words, the frequency of the control signal of the motor 115) of the motor 115 is detected, and the frequency of the impedance measuring signal is set to the non-resonant frequency, whereby the resonance with the motor 115 is prevented, and the accuracy of the impedance measurement is improved.

FIG. 6 is an explanatory view of functions of the control device 80.

As shown in FIG. 6, the control device 80 includes a target voltage decision unit 210, a motor rotation number detection unit 215, a superposition signal generation unit 220, a voltage command signal generation unit 230, an impedance calculation unit 240, and an IV characteristic estimation line preparation unit 250.

The target voltage decision unit 210 determines an output target voltage (e.g., 300 V or the like) based on sensor signals input from an acceleration pedal sensor and an SOC sensor (not shown), and outputs this voltage to the voltage command signal generation unit 230.

The motor rotation number detection unit (detection means) 215 successively detects the rotation number of the motor (an electronic device) 115 controlled by the inverter 110, and outputs the detection result to the superposition signal generation unit 220.

The superposition signal generation unit 220 generates the impedance measuring signal to be superposed on the output target voltage based on the detection result output from the motor rotation number detection unit 215, and outputs this signal to the voltage command signal generation unit 230. This will be described in detail. The superposition signal generation unit (decision means) 220 sets (determines) the frequency of the impedance measuring signal to the non-resonant frequency so that the control signal of the motor 115 does not resonate with the impedance measuring signal. On generating the impedance measuring signal set to the non-resonant frequency, the superposition signal generation unit 220 outputs this signal to the voltage command signal generation unit 230. It is to be noted that the impedance measuring signal may be set to the non-resonant frequency, and another parameter (e.g., a waveform type, an amplitude value or the like) may appropriately be set in accordance with system design or the like.

The voltage command signal generation unit 230 superposes the impedance measuring signal on the output target voltage to output a voltage command signal Vfcr to a DC/DC converter 30. The DC/DC converter 30 controls the voltage of a fuel cell 40 or the like based on the given voltage command signal Vfcr.

The impedance calculation unit (measurement means) 240 samples a voltage (the FC voltage) Vf of the fuel cell 40 detected by a voltage sensor 141 and a current (the FC current) If of the fuel cell 40 detected by a current sensor 142 at a predetermined sampling rate, and performs Fourier transform processing (FET calculation processing or DFT calculation processing) or the like. The impedance calculation unit 240 obtains the impedance (measured impedance) of the fuel cell 40 by dividing an FC voltage signal subjected to the Fourier transform processing by an FC current signal subjected to the Fourier transform processing or the like, and outputs the impedance to the IV characteristic estimation line preparation unit 250. It is to be noted that the measurement timing of the impedance of the fuel cell 40 can arbitrarily be set to a timing during system startup, system stop, intermittent operation or the like.

The IV characteristic estimation line preparation unit 250 uses the real part of the measured impedance output from the impedance calculation unit 240 as the direct-current resistance estimated value Re, and multiplies this direct-current resistance estimated value Re by the FC current detected by the current sensor 142 to obtain the voltage lowering by the direct-current resistance. Then, the IV characteristic estimation line preparation unit 83 obtains the voltage lowering of an activation overvoltage and electromotive voltage change based on an actual operation point of the fuel cell 40 at the present time, the voltage lowering by the direct-current resistance and the like, whereby the IV characteristic estimation line of the fuel cell 40 having a high accuracy can be prepared.

In the above-mentioned example, the frequency of the impedance measuring signal is set so that the resonance between the control signal of the motor 115 and the impedance measuring signal does not occur, but the present invention may be applied to all the devices (the DC/DC converter 130, etc.) that might cause the resonance with the impedance measuring signal. This will be described in detail. As to all the devices connected to the fuel cell 40 and subjected to frequency control (PWM control or the like), the control device (the detection means) 80 detects the frequency of the control signal for controlling the driving of the devices. Then, the control device (the decision means) 80 sets the frequency of the impedance measuring signal to the non-resonant frequency so that the resonance between the control signal of the device and the impedance measuring signal does not occur. In consequence, the resonance with the device can be prevented, and the accuracy of the impedance measurement can be improved in the same manner as in the present embodiment described above.

B. Second Embodiment

FIG. 7 is an explanatory view of functions of a control device 80' according to a second embodiment, and corresponds to FIG. 6 described above. It is to be noted that parts corresponding to those of FIG. 6 are denoted with the same reference numerals, and the detailed description thereof is omitted.

An operation state detection unit (the detection means) 215' detects the output power of a fuel cell 40, and outputs the detection result to a superposition signal generation unit 220'. The superposition signal generation unit (the decision means) 220' determines the frequency of an impedance measuring signal to be superposed on an output target voltage based on a frequency decision map MP1, and outputs the impedance measuring signal having the determined frequency to a voltage command signal generation unit 230.

FIG. 8 is a diagram showing the registered contents of the frequency decision map MP1. The frequency optimum for the impedance measurement varies in accordance with the operation state of the fuel cell 40. To solve the problem, in the present embodiment, the optimum frequency of the impedance measuring signal corresponding to the output power of the fuel cell 40 is obtained by an experiment or the like in advance, and this frequency is mapped. For example, when the output power of the fuel cell 40 detected by the operation state detection unit 215' is in a range of an output power P1 to P2, the superposition signal generation unit 220' reads a frequency fst1 from the frequency decision map MP1, generates the impedance measuring signal having the frequency fst1, and outputs this signal to the voltage command signal generation unit 230. It is to be noted that the subsequent operation can be described in the same manner as in the first embodiment, and hence the description thereof is omitted. Thus, the operation state (the output power in the second embodiment) of the fuel cell 40 is detected, and the frequency of the impedance measuring signal is determined in accordance with the detected operation state, whereby the impedance of the fuel cell can accurately be measured.

In the above example, the output power has been illustrated as the operation state of the fuel cell 40 to be detected, but the present invention is not limited to this example, and the output voltage of the fuel cell 40 may be detected. In such a case, the superposition signal generation unit 220' beforehand stores a frequency decision map MP2 in which the output power of the fuel cell 40 is associated with the frequency of the impedance measuring signal as shown in, for example, FIG. 9. Then, the operation state detection unit (the detection means) 215' detects the output voltage of the fuel cell 40 and outputs the detection result to the superposition signal generation unit 220', whereas the superposition signal generation unit (the decision means) 220' determines the frequency of the impedance measuring signal corresponding to the detected output voltage based on the frequency decision map MP2 and generates the impedance measuring signal having the determined frequency. Thus, the frequency of the impedance measuring signal may be determined based on the output voltage of the fuel cell 40.

BRIEF DESCRIPTION OF THE DRAWING

FIG. 8 is a diagram showing a frequency decision map; and

FIG. 9 is a diagram showing the frequency decision map.

DESCRIPTION OF REFERENCE NUMERALS

Figure 1:
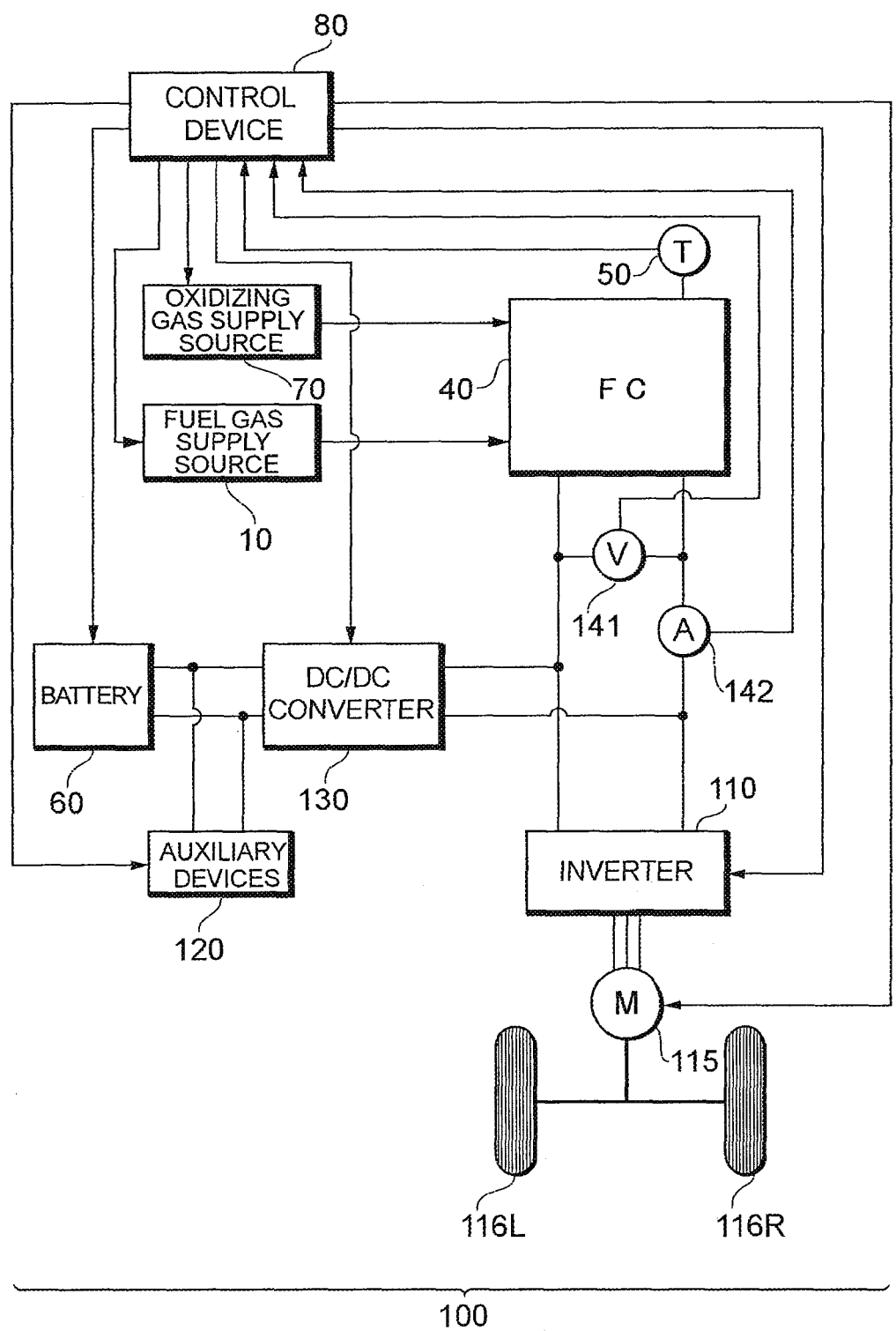
FIG. 1 is a diagram showing a constitution of a fuel cell system according to a first embodiment.
Figure 2:
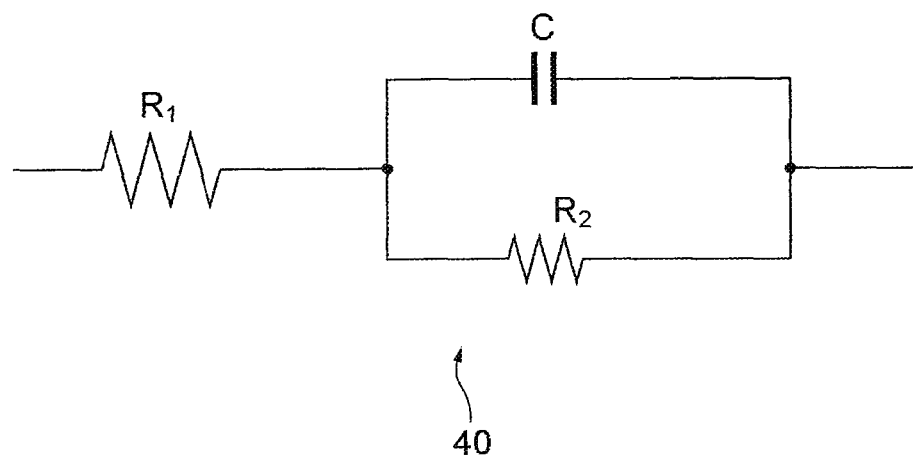
FIG. 2 is a diagram showing an equivalent circuit of a fuel cell.
Figure 3:
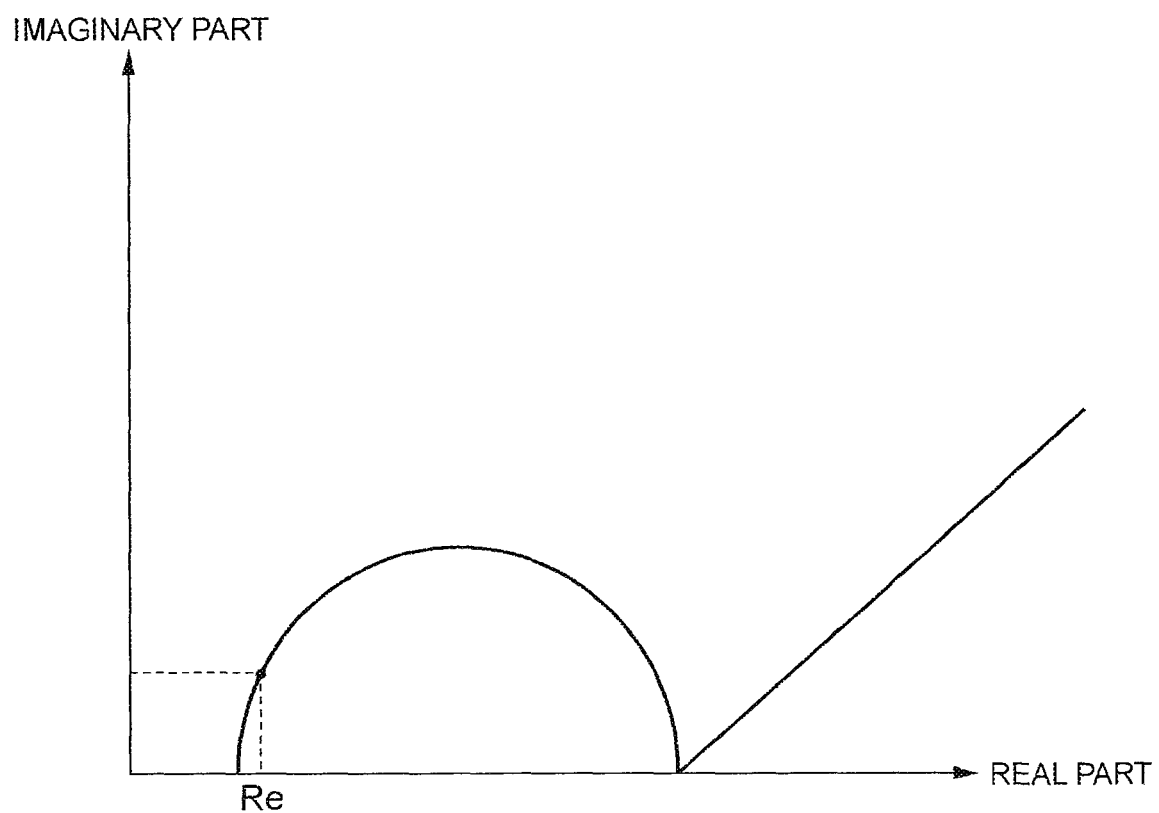
FIG. 3 is a diagram in which the impedance of the fuel cell is plotted on a complex plane.
Figure 4:
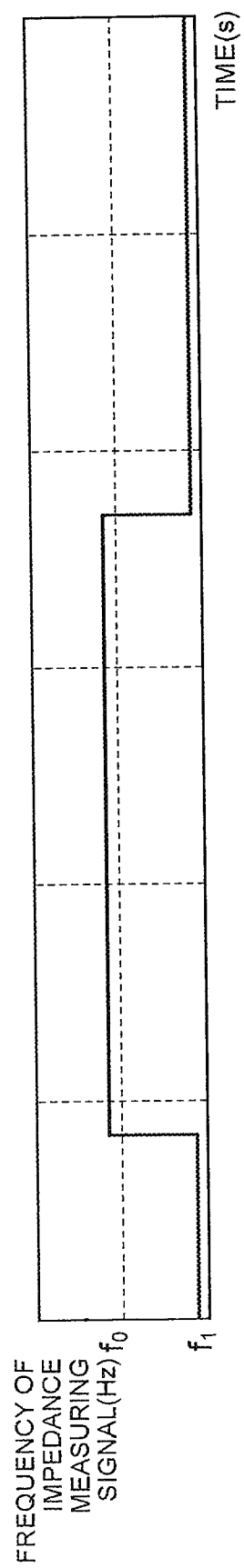
FIG. 4 is an explanatory view of a relation between the frequency of an impedance measuring signal and an alternate-current impedance.
Figure 5:
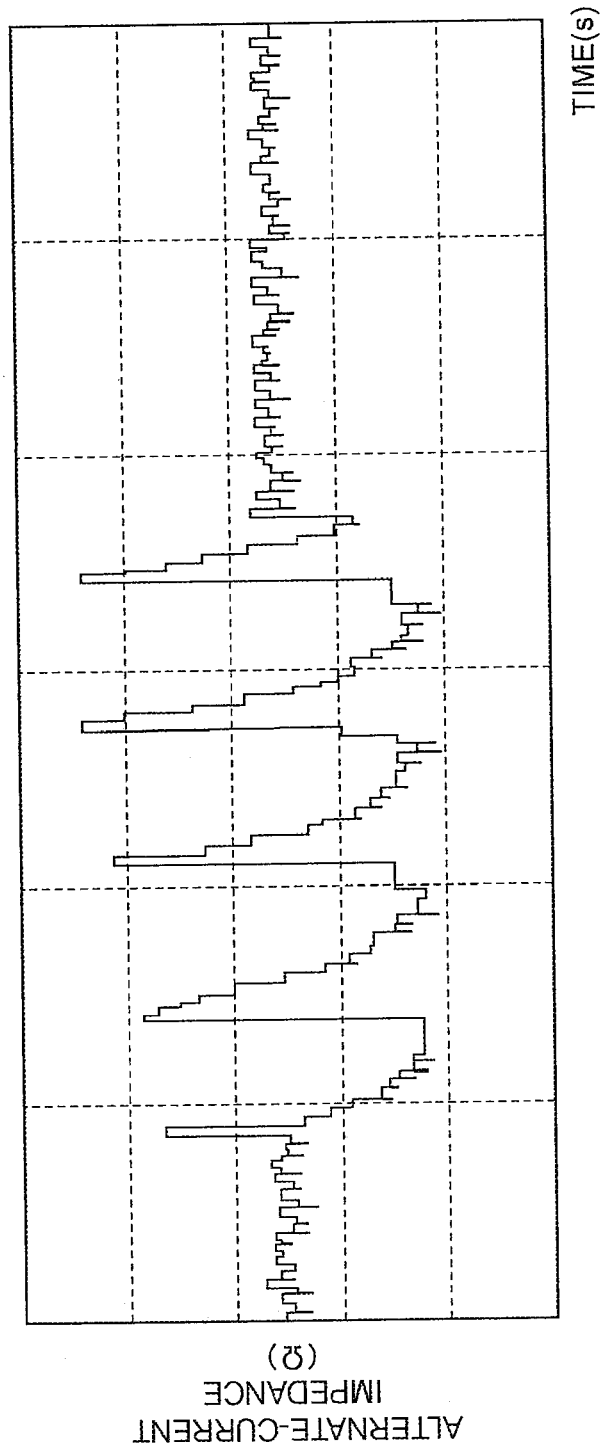
FIG. 5 is an explanatory view of a relation between the frequency of the impedance measuring signal and the alternate-current impedance.
Figure 6:
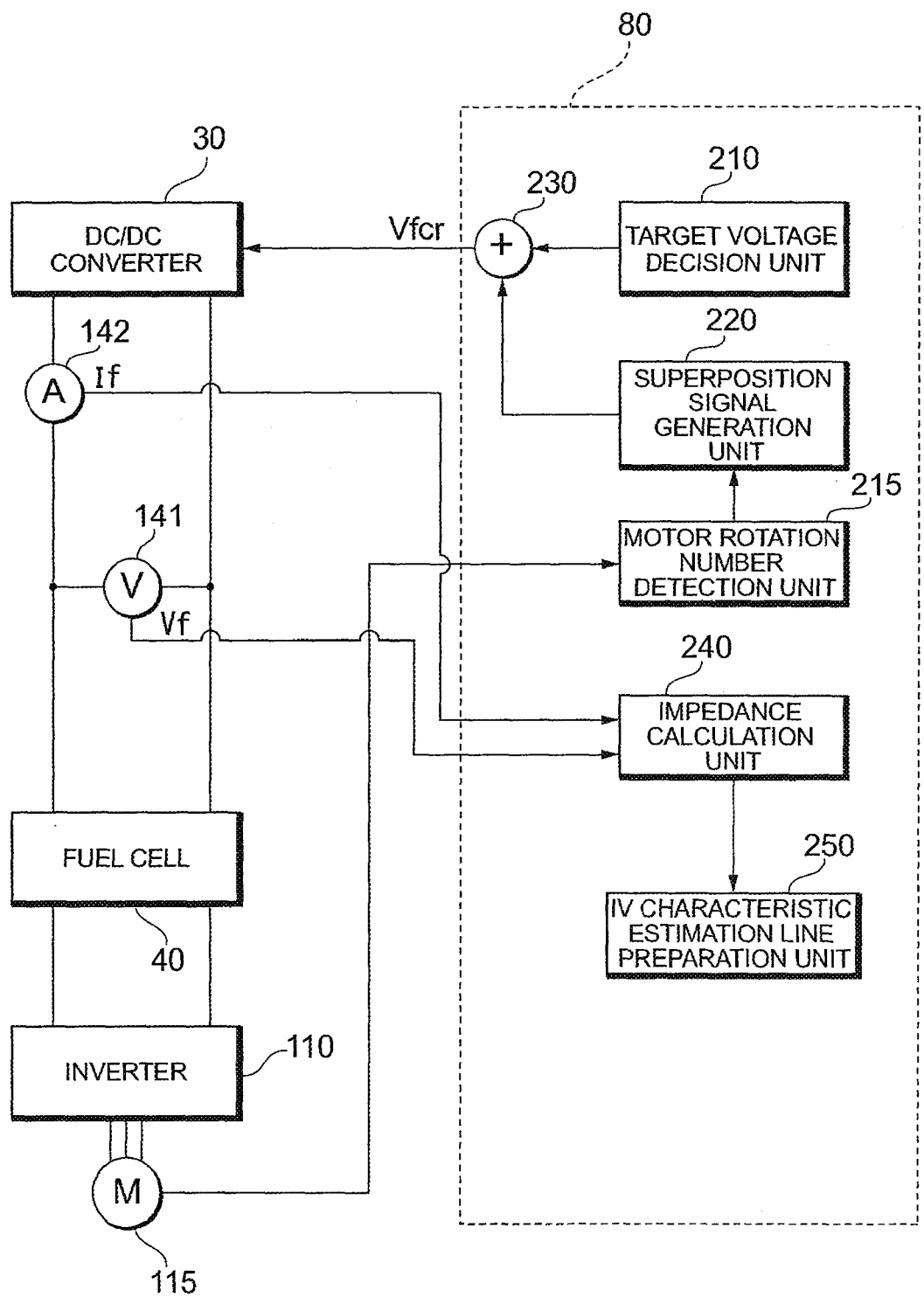
FIG. 6 is an explanatory view of a function of a control unit.
Figure 7:
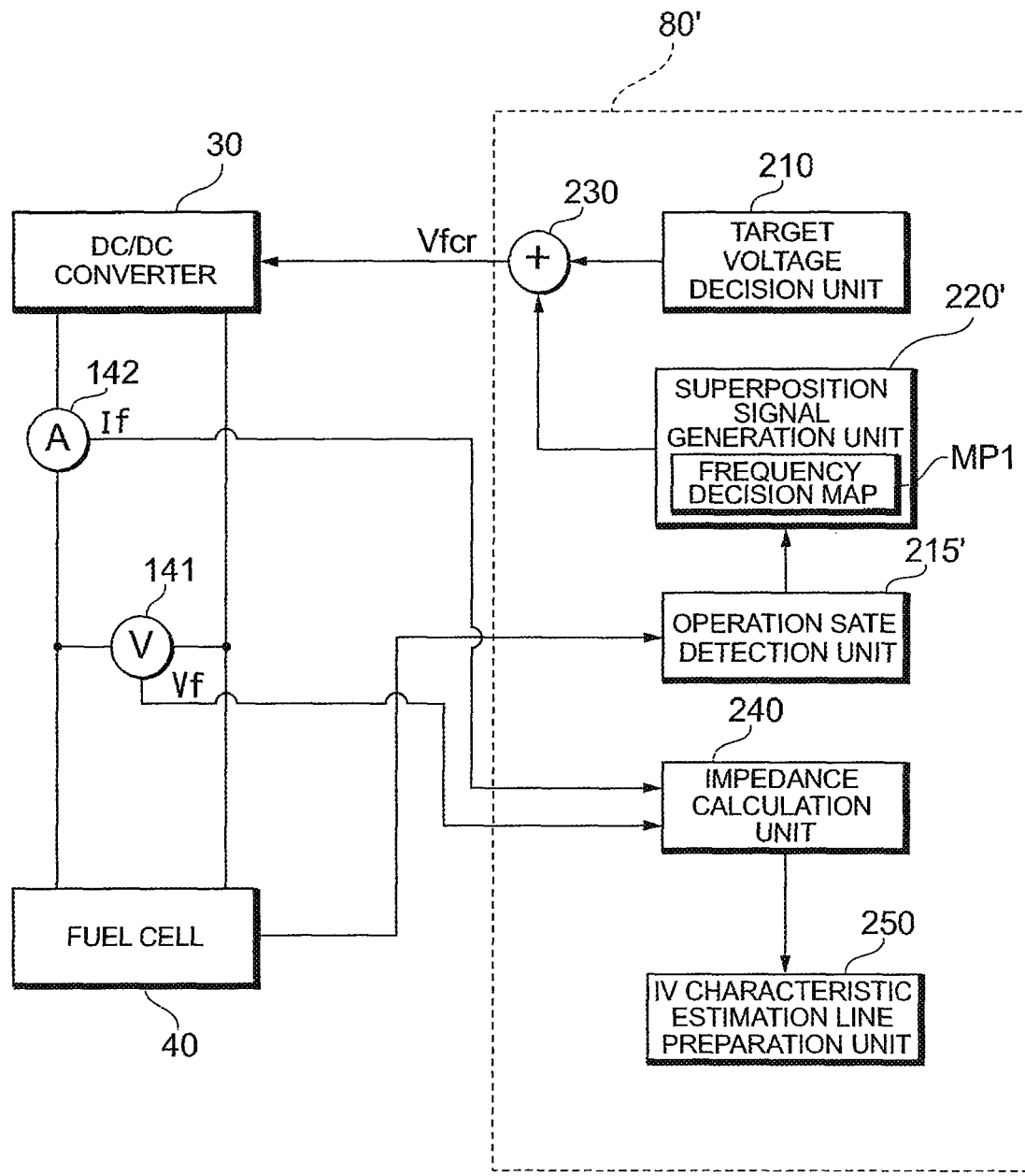
FIG. 7 is an explanatory view of a function of a control unit according to a second embodiment.

10 . . . fuel gas supply source, 40 . . . fuel cell, 50 . . . temperature sensor, 60 . . . battery, 70 . . . oxidizing gas supply source, 80, 80' . . . control device, 210 . . . target voltage decision unit, 220, 220' . . . superposition signal generation unit, 215 . . . motor rotation number detection unit, 215' . . . operation state detection unit, impedance measuring unit, 230 . . . voltage command signal generation unit, 240 . . . impedance calculation unit, 250 . . . IV characteristic estimation line preparation unit, MP1, MP2 . . . frequency decision map, 110 . . . inverter, 115 . . . motor, 116L, 116R . . . wheels, 130 . . . DC/DC converter, 141 . . . voltage sensor, 142 . . . current sensor, and 100 . . . fuel cell system.

The invention claimed is:

1. An impedance measuring system which measures the impedance of a fuel cell, including:
    an electronic device connected to the fuel cell and controlled by a frequency;
    a detection device that detects the frequency of a control signal to control the electronic device;
    a decision device that determines the measurement frequency of the impedance based on the detected frequency; and
    a measurement device that measures the impedance at the determined measurement frequency,
    wherein the decision means determines, as the measurement frequency of the impedance, a frequency which does not resonate with the detected frequency.

2. The impedance measuring system according to claim 1, wherein the electronic device is a motor connected to the fuel cell.

3. An impedance measuring system which measures the impedance of a fuel cell, including:
    an electronic device connected to the fuel cell and controlled by a frequency;
    a control device configured to detect the frequency of a control signal to control the electronic device; configured to determine the measurement frequency of the impedance based on the detected frequency; and configured to measure the impedance at the determined measurement frequency,
    wherein the control device determines, as the measurement frequency of the impedance, a frequency which does not resonate with the detected frequency.

4. The impedance measuring system according to claim 3, wherein the electronic device is a motor connected to the fuel cell.

\* \* \* \* \*